United States Patent
Yelahanka Raghuprasad et al.

(10) Patent No.: US 12,444,178 B2
(45) Date of Patent: Oct. 14, 2025

(54) INFERRING THE USER EXPERIENCE FOR VOICE AND VIDEO APPLICATIONS USING PERCEPTION MODELS

(71) Applicant: Cisco Technology, Inc., San Jose, CA (US)

(72) Inventors: Mukund Yelahanka Raghuprasad, San Jose, CA (US); Jean-Philippe Vasseur, Saint Martin d'Uriage (FR); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 609 days.

(21) Appl. No.: 17/869,015

(22) Filed: Jul. 20, 2022

(65) Prior Publication Data

US 2024/0029417 A1  Jan. 25, 2024

(51) Int. Cl.
*G06V 10/776* (2022.01)
*G06V 10/778* (2022.01)

(52) U.S. Cl.
CPC ........ *G06V 10/776* (2022.01); *G06V 10/7784* (2022.01)

(58) Field of Classification Search
CPC ............. G06V 10/776; G06V 10/7784; H04L 41/5019; H04L 41/0823; H04L 43/10; H04L 41/5009; H04L 41/16
USPC .......................................................... 709/238
See application file for complete search history.

(56) References Cited

U.S. PATENT DOCUMENTS

| | | |
|---|---|---|
| 8,405,773 B2 | 3/2013 | Hayashi et al. |
| 10,721,477 B2 | 7/2020 | Li et al. |
| 2019/0143216 A1* | 5/2019 | Tortosa .................. A63F 13/30 463/23 |
| 2021/0120209 A1* | 4/2021 | Peters .................... H04N 7/152 |
| 2022/0261819 A1* | 8/2022 | Litvak-Hinenzon ........................ G06Q 30/018 |

FOREIGN PATENT DOCUMENTS

| | | |
|---|---|---|
| CN | 112967735 A | 6/2021 |
| WO | 2020/227781 | 11/2020 |

OTHER PUBLICATIONS

Jiang, et al., "Speech Recognition Performance as an Effective Perceived Quality Predictor", IEEE 2002 Tenth IEEE International Workshop on Quality of Service, May 2002, pp. 269-275, IEEE.
Becerra Martinez, et al., "Perceptual Quality of Audio-Visual Content with Common Video and Audio Degradations", Applied Sciences, Jun. 2021, 11, 5813, 30 pages, MDPI.

(Continued)

*Primary Examiner* — Adil Ocak
(74) *Attorney, Agent, or Firm* — Lee & Hayes, P.C.; James M. Behmke

(57) ABSTRACT

In one embodiment, a device obtains perception results generated by one or more perception models that use media data as input that is transmitted between endpoints of an online application via a network. The device computes performance measures for the one or more perception models, based in part on the perception results and on the media data. The device quantifies, based on the performance measures, quality of experience for the online application. The device causes a configuration change to be made with respect to the online application, based on the quality of experience.

20 Claims, 11 Drawing Sheets

(56) References Cited

OTHER PUBLICATIONS

Akhtar, et al., "Why Is Multimedia Quality of Experience Assessment a Challenging Problem?", Digital Object Identifier, vol. 7, Sep. 2019, pp. 117897-117915, IEEE Access.
Wu, et al., "An Intelligent Perception Model and Parameters Adjust Method for Quality of Experience", Electronics, May 2022, 11, 1732, 13 pages, MDPI.

\* cited by examiner

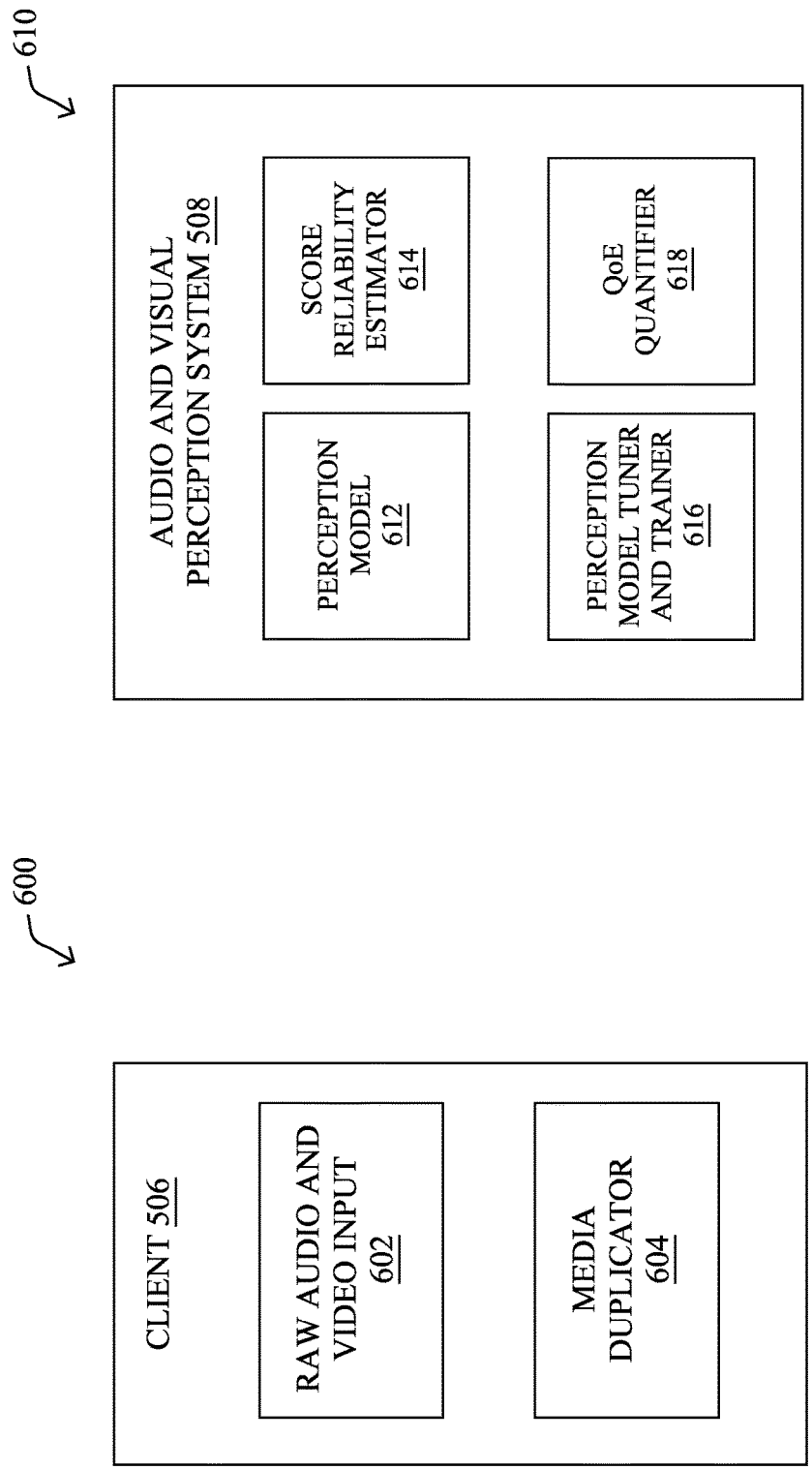

INFERRING THE USER EXPERIENCE FOR VOICE AND VIDEO APPLICATIONS USING PERCEPTION MODELS

TECHNICAL FIELD

The present disclosure relates generally to computer networks, and, more particularly, to inferring the user experience for voice and video applications using perception models.

BACKGROUND

The user experience with online media applications, such as those used for video conferencing, streaming content, etc., is highly dependent on the performance of the network over which its traffic is conveyed. Today, the quality of experience (QoE) of media streams is often measured using static formulas and service level agreement (SLA) threshold definitions. The most prevalent method in use today relies on calculating the QoE as a mean opinion score (MOS) value. The formula for deriving the MOS value from network measurements (e.g., loss, latency, jitter) is also largely standardized, with the "E-Model" defined in the G.107 standard from the International Telecommunication Union (ITU) being the latest and mostly widely adopted methodology.

Testing has revealed that MOS values are not always a good proxy for the true QoE of media applications for multiple reasons. First, while MOS values can indicate some aspects of the QoE for a user, they are still deterministic to a high degree and can only indicate a 'failure' in the QoE. In other words, it is difficult to discern whether one media session is better than another unless there is a significant difference in the MOS distributions for those sessions. In addition, these measures also fail to take into consideration the various user-specific effects, network effects, and application-level effects that can affect the true QoE of the application.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 6A-6C illustrates example architectures for inferring the QoE of an online application.

DESCRIPTION OF EXAMPLE EMBODIMENTS

Overview

Figure 1A:
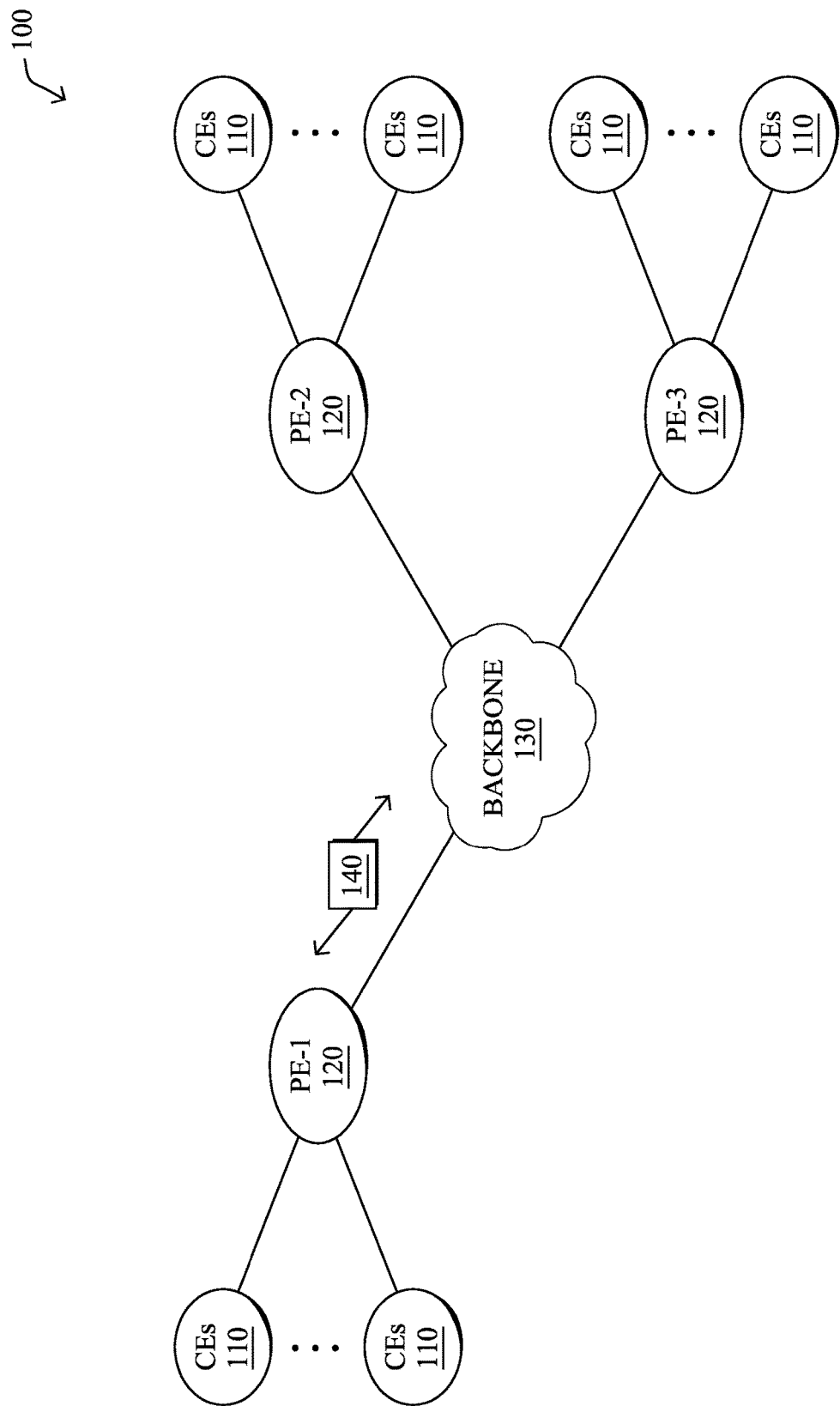
FIGS. 1A-1B illustrate an example communication network.

According to one or more embodiments of the disclosure, a device obtains perception results generated by one or more perception models that use media data as input that is transmitted between endpoints of an online application via a network. The device computes performance measures for the one or more perception models, based in part on the perception results and on the media data. The device quantifies, based on the performance measures, quality of experience for the online application. The device causes a configuration change to be made with respect to the online application, based on the quality of experience.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
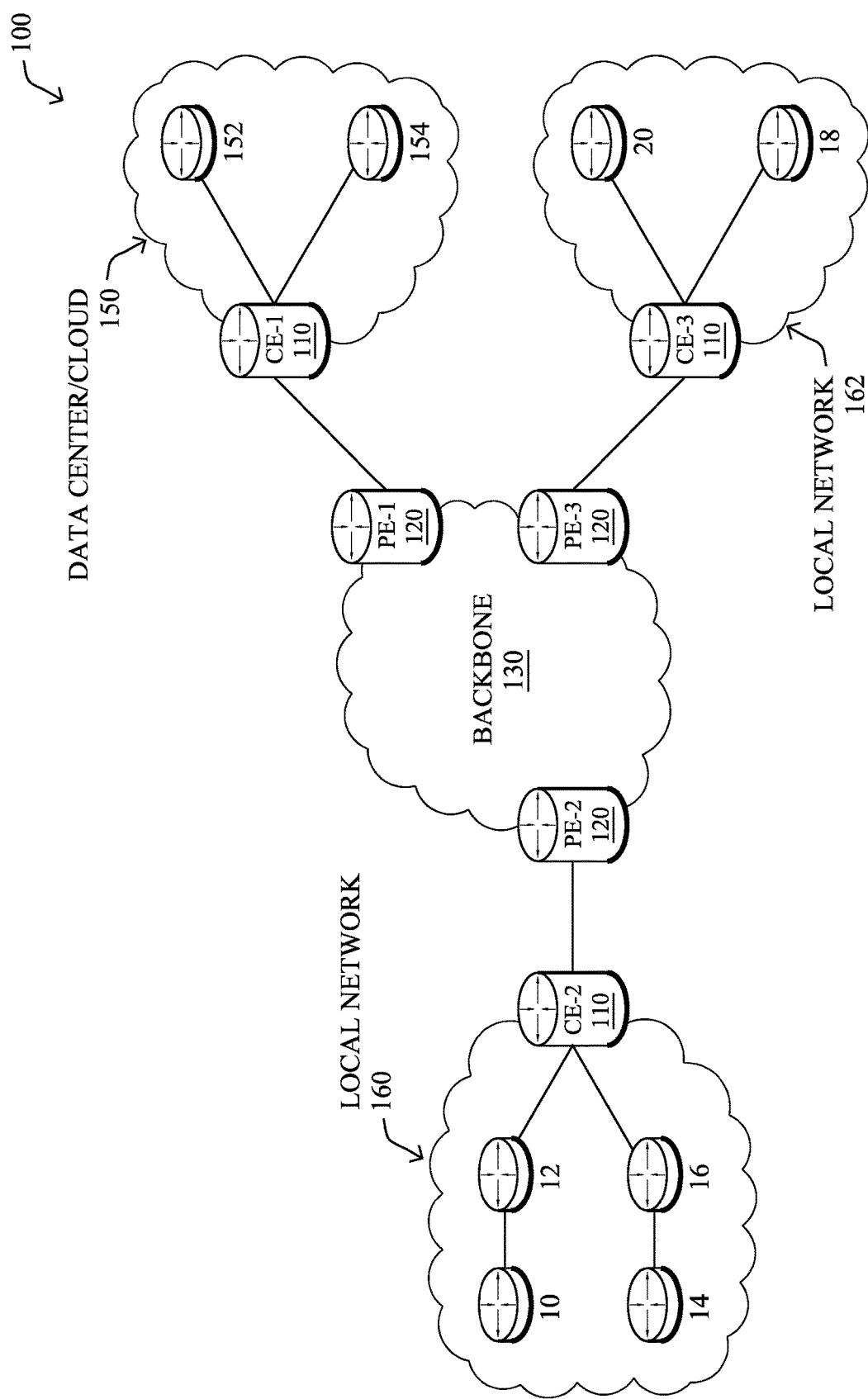

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
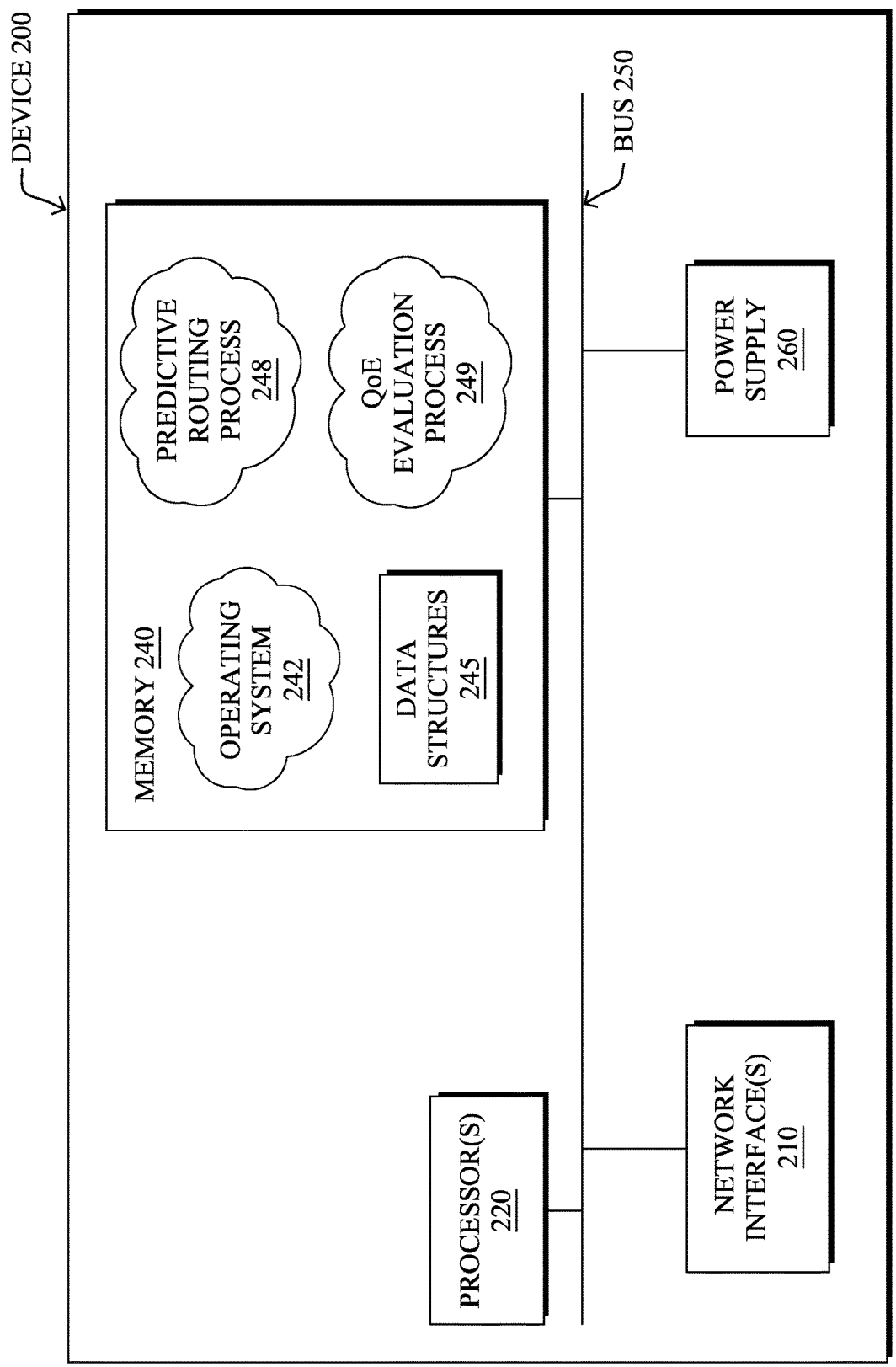
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a QoE evaluation process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 and/or QoE evaluation process 249 include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc.

In various embodiments, as detailed further below, predictive routing process 248 and/or QoE evaluation process 249 may include computer executable instructions that, when executed by processor(s) 220, cause device 200 to perform the techniques described herein. To do so, in some embodiments, predictive routing process 248 and/or QoE evaluation process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 and/or QoE evaluation process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 and/or QoE evaluation process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel.

Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
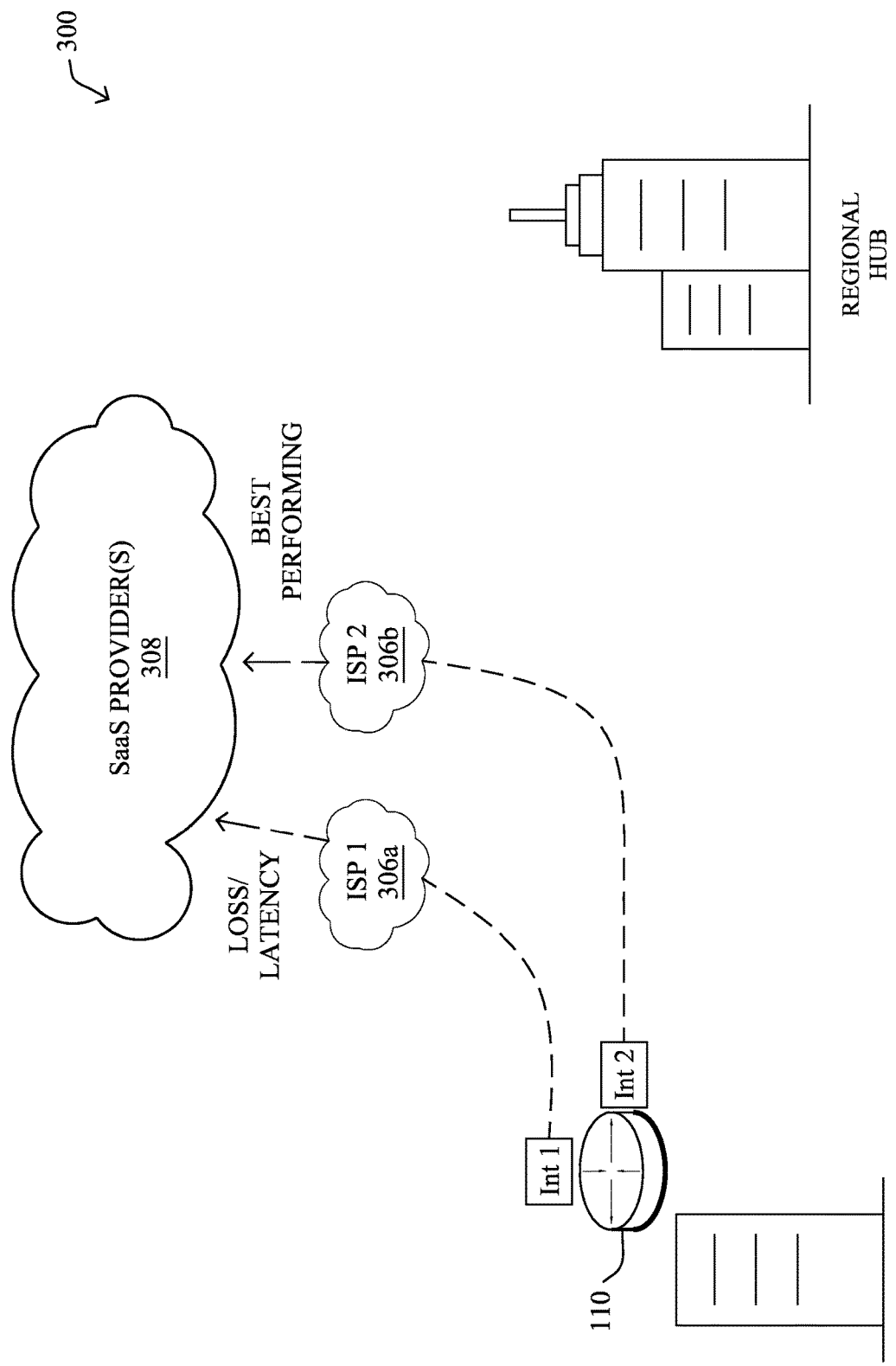
FIGS. 3A-3B illustrate example network deployments.
Figure 3B:
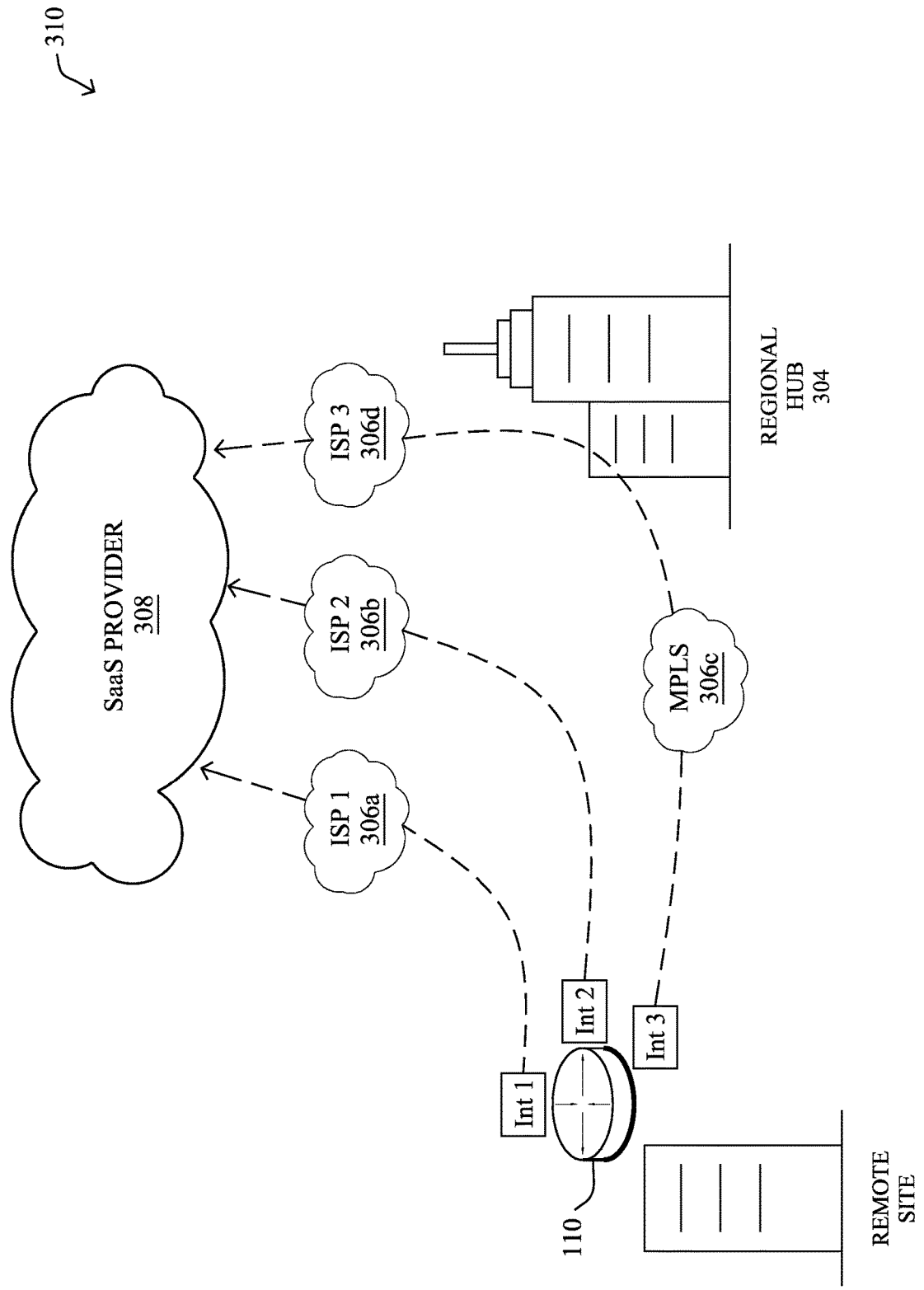

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
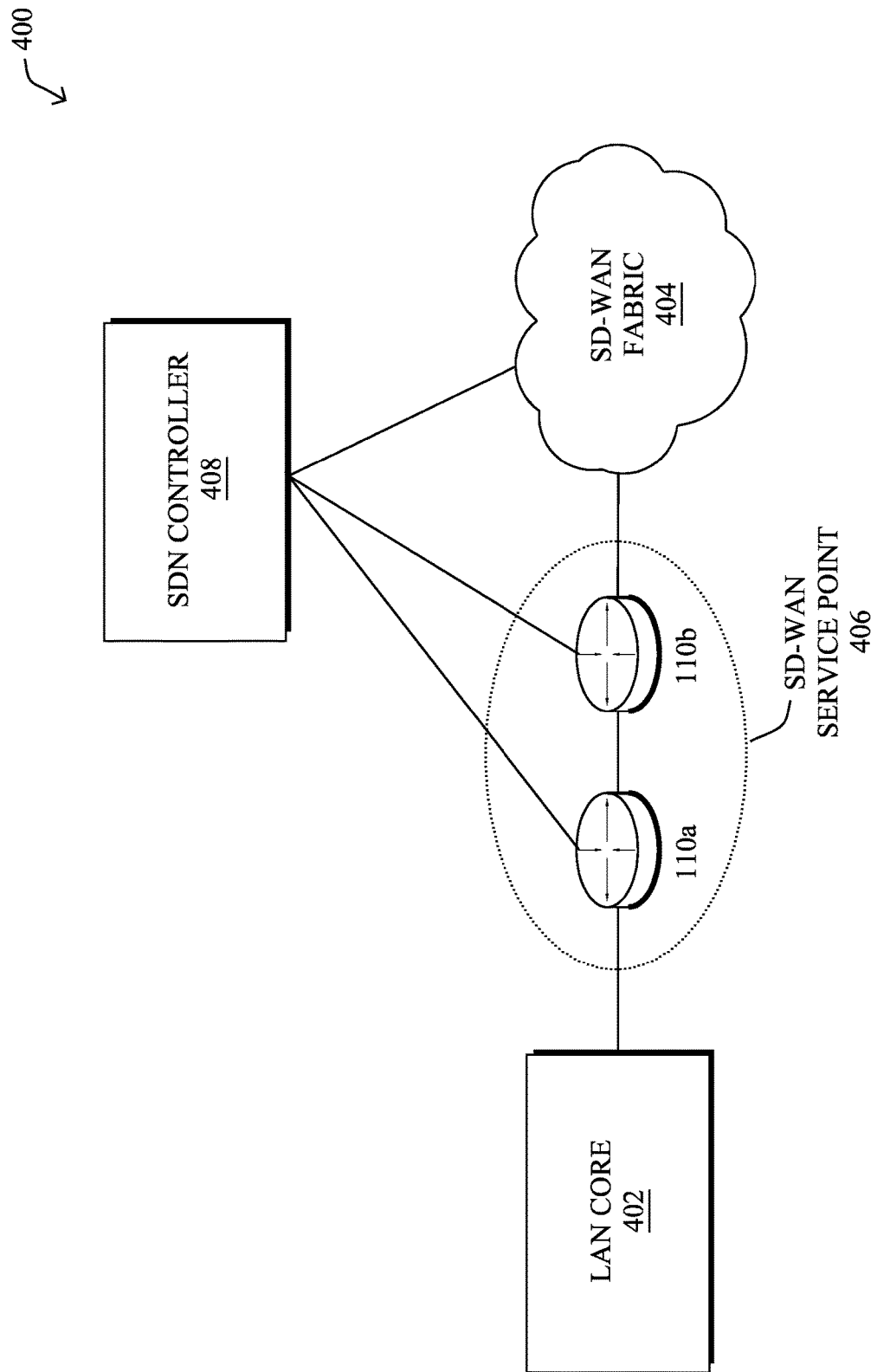
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance. SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side. SD-WAN provides a high degree of flexibility allowing for efficient configuration management using SDN controllers with the ability to benefit from a plethora of transport access (e.g., MPLS, Internet with supporting multiple CoS. LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS. LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed.' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
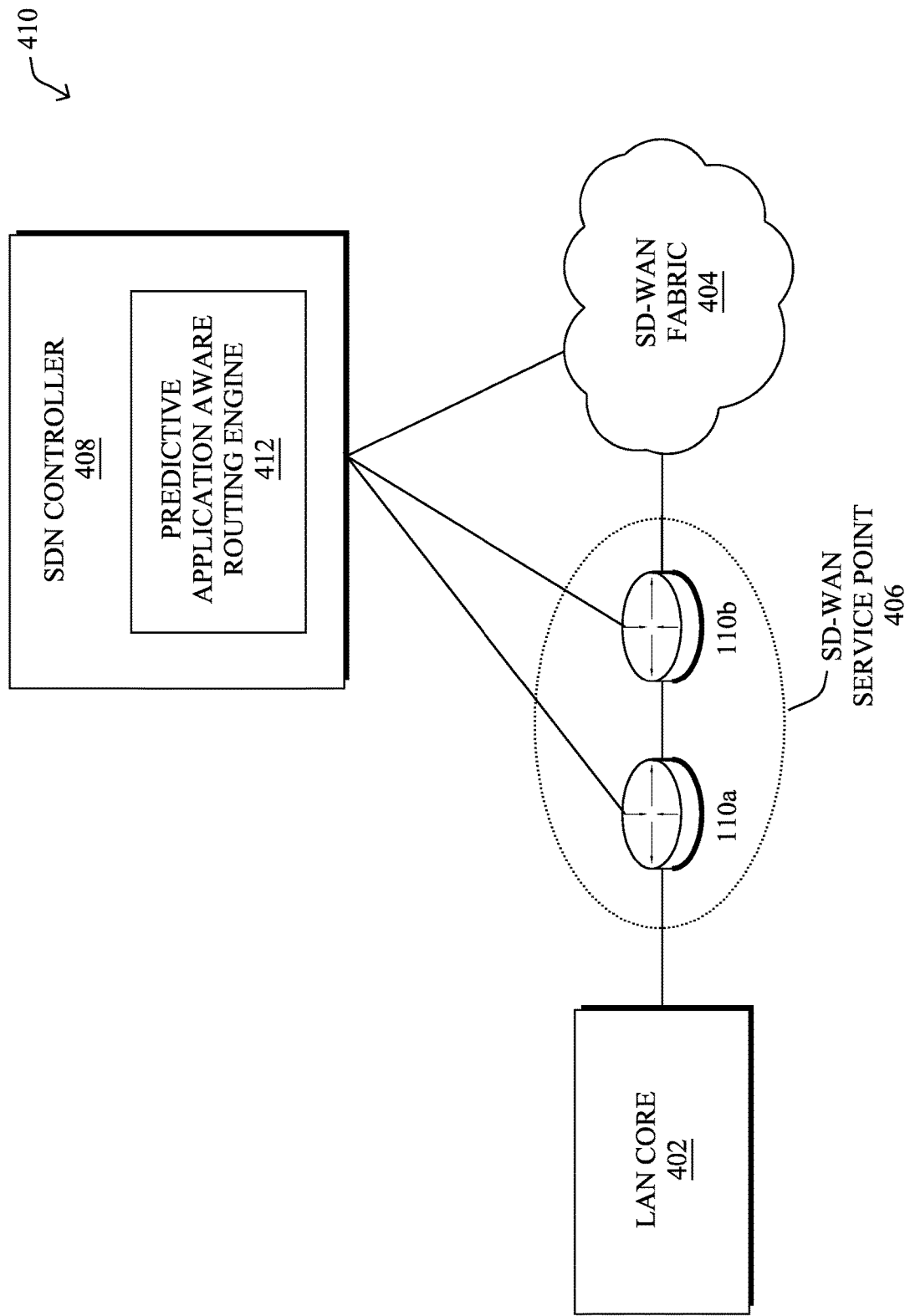

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, the user experience with online media applications, such as those used for video conferencing, streaming content, etc., is highly dependent on the performance of the network over which its traffic is conveyed. Today, the QoE of media streams is often measured using static formulas and SLA threshold definitions. The most prevalent method in use today relies on calculating the QoE as a mean opinion score (MOS) value. The formula for deriving the MOS value from network measurements (e.g., loss, latency, jitter) is also largely standardized, with the "E-Model" defined in the G.107 standard from the International Telecommunication Union (ITU) being the latest and mostly widely adopted methodology.

Testing has revealed that MOS values are not always a good proxy for the true QoE of media applications for multiple reasons. MOS values are not always a good proxy for the true QoE of media applications for multiple reasons. First, while MOS values can indicate some aspects of the QoE for a user, they are still deterministic to a high degree and can only indicate a 'failure' in the QoE. In other words, it is difficult to discern whether one media session is better than another unless there is a significant difference in the MOS distributions for those sessions. In addition, these measures also fail to take into consideration the various user-specific effects, network effects, and application-level effects that can affect the true QoE of the application. For instance, forward error correction (FEC), specialized codecs that are tolerant to packet loss, and the like, could be employed, to lessen the effects of lowered network performance on the true QoE of the application.

While user-supplied QoE labeling is the best possible measure of the true user experience, there are several disadvantages to relying on such labels. First, user-supplied labels could sometimes be noisy and are extremely subjective in nature. Second, they are harder to collect and collecting the potentially millions of such labels needed by a learning system to take corrective measures would be extremely cumbersome. Third, Third, such labels are usually collected at the end of a call or other media session and represent the session as a whole. This leads to the real possibility of a particularly bad, but short-lived, user-experience for a given session being either under reported or not reported at all by the users.

——Inferring the User Experience for Voice and Video Applications Using Perception Models——

The techniques introduced herein provide for the QoE/user experience of an online application to be quantified based on perception results from perception models that analyze the media shared via the application. In general, such perception models estimate the quality of the human perceptible information contained in the transmitted media (e.g., audio and/or video traffic) sent and received by the endpoints of the online application. Typically, the media is scored in such a way that the same media that a user receives or sends during a session, to capture any perturbations of the media due to the performance of the network (e.g., due to packet loss, latency, jitter, etc.). Thus, such scoring provides an estimate of the perceptibility of such perturbed media and can be used to quantify the QoE of the application much closer to the actual user experience. In turn, the QoE scores can be used to make configuration changes regarding the application, such as by effecting a routing or other change to the network, adjusting parameters of the endpoints (e.g., to use FEC, a certain codec, etc.), or the like.

Illustratively, the techniques described herein may be performed by hardware, software, and/or firmware, such as in accordance with QoE evaluation process 249, which may include computer executable instructions executed by the processor 220 (or independent processor of interfaces 210) to perform functions relating to the techniques described herein, such as in conjunction with the operation of predictive routing process 248.

Specifically, according to various embodiments, a device obtains perception results generated by one or more perception models that use media data as input that is transmitted between endpoints of an online application via a network. The device computes performance measures for the one or more perception models, based in part on the perception results and on the media data. The device quantifies, based on the performance measures, quality of experience for the online application. The device causes a configuration change to be made with respect to the online application, based on the quality of experience.

Operationally, an aim of the techniques herein is to allow a media sharing system to estimate the true user experience of its online application by making use of perception models that are able to extract information from the media shared by endpoints of the system. For instance, in some embodiments, the perception models may take the form of speech recognition models for audio perception, object or movement detection models for video perception, or the like.

In general, the techniques herein may be implemented in conjunction with a media sharing system, such as a collaboration system (e.g., a videoconferencing system, etc.) or the like. In general, such a system may include any number of endpoints that communicate with one another over a network via an online application. For instance, in the case of a video conference, the endpoints may each execute client applications that allow a particular endpoint to share media data (i.e., audio and/or video) with the other endpoints during a call. In addition to the endpoints may also be one or more media servers that facilitate the transmission of the media between the endpoints.

In some embodiments, a forecasting mechanism may be employed as part of the media sharing system, to predict application failures (e.g., unacceptable performance metrics) or other disruptions to the user experience. The predicted application failures and other disruptions may be signaled back to the media server and/or elsewhere, so that corrective measures can be enacted in the case of unacceptable user experience. Possible actions by the server could indicate changes to the network paths connecting the endpoint clients, changes to how the online application operates, or other proactive changes to the network infrastructure that can improve the user experience.

Figure 5:
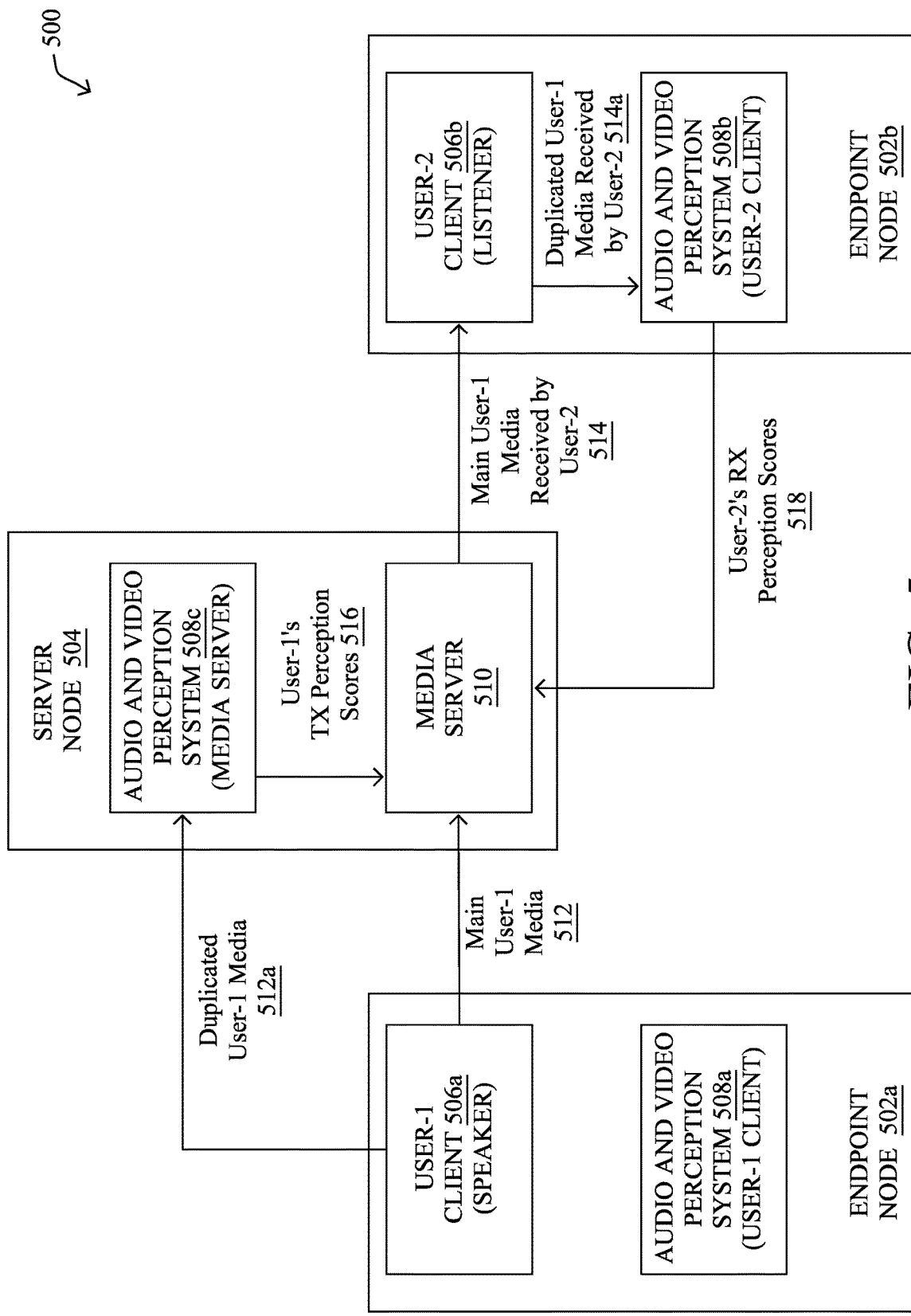
FIG. 5 illustrates an example system for inferring the quality of experience (QoE) of an online application.

FIG. 5 illustrates an example system 500 for inferring the quality of experience (QoE) of an online application, according to various embodiments. As shown, system 500 may include any number of endpoint nodes 502, such as endpoint nodes 502a-502b, which communicate with one another over a network via an online application. For simplicity, only two endpoint nodes 502 are shown, but system 500 may include any number of endpoint nodes 502, in further instances. In addition, system 500 may also include a server node 504 associated with the online application that facilities calls or other media sessions between endpoint nodes 502.

As shown, system 500 may include any or all of the following components: clients 506, audio and video perception systems 508, and/or a media server 510, in various embodiments. Such components may be implemented, for instance, through the execution of specialized software (e.g., QoE evaluation process 249), either as part of the online application itself or in conjunction therewith.

In general, clients 506a-506b are executed by their respective endpoint nodes 502a-502b and are used to convey media data between them via a network. Likewise, media server 510 may typically reside in the cloud or a data center and orchestrate the flow of the media data between the endpoint nodes 502. In various embodiments, audio and video perception systems 508 may also be executed by the endpoint nodes 502 and are responsible for the generation of perception scores associated with the media data shared by the endpoint nodes 502.

In some instances, a data collection mechanism (not shown) may also be implemented as part of system 500 that is responsible for collecting data from the devices and online application, such as for storage in a central datalake. This component fetches tunnel health metrics from different probes (such as BFD or CXP) that indicates several metrics such as loss, latency, jitter and throughput on all tunnels and direct Internet access (DIA) paths. In addition, it may also collect NetFlow data that describe the application usage from the standpoint of the network. It may also collect application feedback data from various online applications, which may take the form of user feedback such as a continuous number or a discrete value (e.g., 'good,' 'degraded,' 'bad,' or 'no-opinion'). Multiple feedback metrics could also be obtained, in some cases.

An important aspect of system 500 is that it allows for the scoring of the media data, without disturbing the natural flow of the media via the online application for communication. To do so, the media data that is communicated between endpoint nodes 502 may be duplicated and the duplicate copies analyzed separately, so as not to disrupt the media session or call. Additionally, the techniques herein enable system 500 to experiment and explore the effect of different application parameters, network parameters, and/or possible network impairment scenarios without affecting the real-time media streams.

For instance, consider the case in which endpoint nodes 502a-502b participate in a videoconference in which the user of endpoint node 502a is a presenter (e.g., a 'speaker') and the user of endpoint node 502b is a meeting attendee (e.g., a 'listener'). In such a case, client 506a may send media data 512 via the network for delivery to client 506b of endpoint node 502b. In some instances, this may be done by sending media data 512 to media server 510, which distributes the media data 512 to the endpoint clients participating in the call, such as client 506b. Regardless, as a result, client 506b may receive a form of media data 512, media data 514, which may perfectly match that of media data 512 or be altered in some manner, such as due to performance issues along the network path(s).

In some embodiments, client 506a may send a duplicate of media data 512, media data 512a, to audio and video perception system 508c of server node 504 for further analysis. In addition, as shown and detailed further below, audio and video perception systems 508a-508b executed by endpoint nodes 502a-502b may execute perception models on the media data and provide the resulting perception scores/results to media server 510 for further analysis. For instance, on receipt of media data 514, client 506b may provide a duplicate copy 514a of media data 514 as input to the perception model of audio and video perception system 508b. In turn, audio and video perception system 508b may provide the resulting perception scores 518 to media server 510.

Figure 6C:
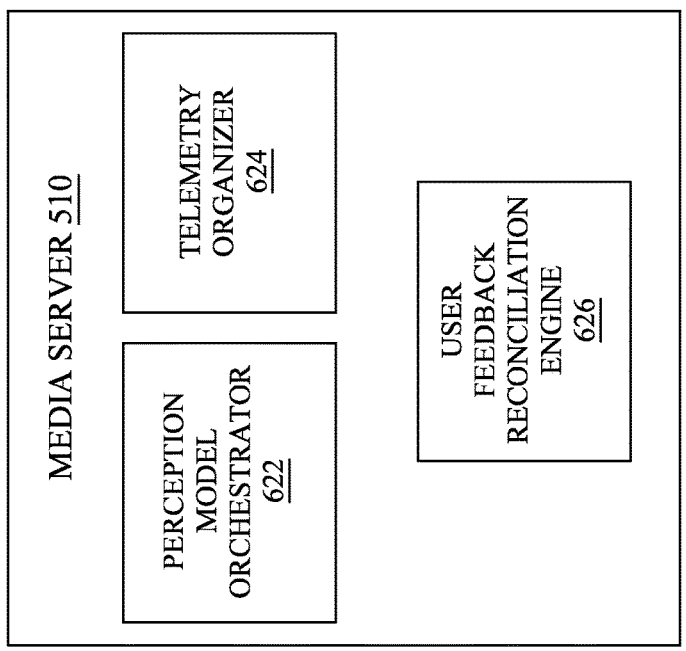

FIGS. 6A-6C illustrates example architectures for inferring the QoE of an online application, according to various embodiments. More specifically, FIG. 6A illustrates an example architecture 600 for a client 506, such as any of clients 506a-506b shown in FIG. 5. Similarly, FIG. 6B illustrates an example architecture 610 for an audio and video perception system 508, such as any of audio and video perception systems 508a-508c executed by endpoint nodes 502a-502b or server node 504 in FIG. 5, respectively. Finally, FIG. 6C illustrates an example architecture 620 for media server 510 shown in FIG. 5.

As would be appreciated, the functionalities of the various components of architectures 600, 610, and 620 in FIGS. 6A-6C may be combined or omitted, as desired. In addition, these components may be implemented on a singular device or in a distributed manner, in which case the combination of executing devices can be viewed as their own singular device.

In FIG. 6A, client 506 may include a media duplicator 604, which is responsible for duplicating the raw audio and/or video input data 602 to be sent to another endpoint or endpoints of the online application. For instance, in the case of a video conference, data 602 may include video captured by a camera, audio captured by a microphone, screen sharing video, or the like. Such functionality ensures that the analysis of the media data does not cause any additional impedance to the main communication channels.

In some embodiments, client 506 may also track and report the transmit network parameters for the main communication path and ensure that the duplicate stream also experiences similar conditions. Doing so ensures that the duplicate media also undergoes similar deterioration as the main communication media. With this, media duplicator 604 has the ability to accumulate the duplicated media being produced and send the same in a staggered fashion to the media server 510 with recreated network conditions. Such a staggered approach to transmitting the duplicated stream also ensures that the main communication line does not experience high network overhead and further deteriorate the communication.

As shown in FIG. 6B, audio and video perception system 508 may be executed on both the endpoint nodes and media server of the online application. When they reside at a user device/endpoint (e.g., either of endpoint nodes 502a-502b in FIG. 5), it may be responsible for scoring the media that that is received by the user client of that endpoint. When resident at a server node (e.g., server node 504 in FIG. 5), it may be responsible for scoring the media data that is transmitted by the endpoint nodes participating in the media session or call. This allows for the QoE to be estimated for the network path between the user client to the media server.

In various embodiments, audio and video perception system 508 may include a perception model 612 that is responsible for computing a perception score for a given set of media data (i.e., audio and/or video data). In general, the perception scores/results indicate the quality of human perceptible information contained within the media data that is being scored by perception model 612.

Perception model 612 may take the form of any model that takes in as input media data and extracts human perceptible information contained in that data. For instance, in the case of audio data, perception model 612 may take the form of a speech recognition model that seeks to perceive/identify the words contained in the audio data. Similarly, in the case of video data, perception model 612 may take the form of a video analytics model that detects objects and/or actions within video data (e.g., detecting the person speaking through lip movements, etc.). Of course, perception model 612 may also be configured to assess media data that includes both audio and video, such as through the use of sub-models to assess both the audio and the video in the media data.

In various embodiments, the techniques herein propose leveraging the use of perception model 612 for purposes of quantifying the QoE of the online application, which may be deteriorated by network conditions. The assumption here is that perception models can perform these tasks well if the audio/video signal input provided is of good quality. Conversely, when the signals are deteriorated, the performance of the perception models deteriorate, too. Such deterioration can be measured by model performance metrics like model variance, model accuracy, model confidence, combinations thereof, or the like. Thus, the performance of perception model 612 can be used to quantify the QoE of the online application and trigger corrective measures, as needed.

In other words, in various embodiments, the techniques herein propose leveraging the correlation between the accuracy of a perception model (e.g., a speech and/or video recognition model) and the QoE provided by a network path. This can also be done without ground truth labels for the perception tasks performed, but rather by deriving the QoE measures from model performance metrics, such as confidence measures. Indeed, without the ground truth for the perception tasks performed by perception model 612, it is not possible to compute the actual performance/accuracy of perception model 612. Instead, in some embodiments, confidence metrics may be used to represent its performance. Such confidence metrics could be the model confidence that can be extracted from the models or other metrics which estimate the correctness of the perception tasks performed by perception model 612. An example of such a confidence metric for speech recognition would be measures such as Word Confidence Measures, Semantic Confidence Measures, or the like, which have been shown to reliably estimate the correctness of the words transcribed given the rest of the transcribed text. Such model confidence metrics can then be converted or used as performance metrics for perception model 612, from which the QoE can be estimated.

While the confidence of perception model 612 for a perception task also depends on factors such as the words being transcribed, the voice of the speaker, their accent, etc., perception model 612 may be fine-tuned to a particular speaker and can be designed such that the confidence measure depends primarily on the quality of the audio signal. Thus, perception model 612 can produce perception results that depends on the quality of the input media data, where the perception task is analogous to what humans experience or perform when they are engaged in a call or other media session.

In other words, the confidence of perception model 612 may be used to reflect the user QoE such that if the confidence is low then this means that the quality of the media is also low and the user experience will be poor. It has been shown that realistic machine learning can be used to model the human auditory system, although audition is arguably less understood than the human visual system. Sophisticated models can also be used to model the operation of the human cochlea. Moreover, convolutional neural networks (CNNs) have also been shown to be able to distinguish words in audio and objects/actions in video, such as a function of the background signal-to-noise ratio (SNR). Similar results were found to solve the complex task of sound localization as a function of the number of sources or even pitch perception.

As noted, perception model 612 may also be configured such that it is robust with respect to many subjective factors like the accent, language, etc., of the speaker, their speaking voice, voice texture, and the like. However, real world calls include many more factors may not be modeled efficiently by perception model 612. Examples of such cases are when speakers use words which are part of technical jargon and are not common to the language being transcribed, when the speaker's audio is impacted by some actual external sound/noise on the speaker's side, etc. The confidence/performance metrics for perception model 612 would be low for such cases and will be reflected through bad perception results, even though the model is well trained and the network QoE is good.

To address such misrepresentations, audio and video perception system 508 may also include score reliability estimator 614, which takes in as input the audio/video signals along with the output from perception model 612 and computes a reliability score for each segment of the media. In one embodiment the reliability score can be computed by estimating the amount of actual external noise contained in a speaker's audio. Thus, the higher the noise, the lower the reliability for the segment which contains the noise.

In another embodiment where speech-to-text is used, score reliability estimator 614 may use the transcribed text and with the help of language models estimate the probability of a word occurring in the sentence that has been transcribed. For example, consider the case in which the presenter/speaker in a video conference uttering the question, "Did you watch the keynote by Mrs. Robbins?" In this situation, "Robbins" is not a common word and perception model 612 may wrongly translate the question as "Did you watch the keynote by Mrs. robbing?" The corresponding perception score for the word "Robbins" would also be low, because the speech recognition model is simply not familiar with the word "Robbins" and would be assign the closest known word with a low confidence. This low perception score could falsely indicate bad QoE. However, using language models, score reliability estimator 614 may determine that the word "robbing" in the resulting transcript from perception model 612 has a very low probability of existing after the initial sentence "Did you watch the keynote by Mrs." Considering this, score reliability estimator 614 may assign a low reliability score for the audio segment containing the word "Robbins."

The system can then filter out the perception results from perception model 612 for media where the reliability is low and compute a final score that is more robust against such factors which artificially impact the model confidence and the resulting QoE metric.

In various embodiments, audio and video perception system 508 may also include perception model tuner and trainer 616, which tunes perception model 612 to a certain user and their specific characteristics. Such tuning can reduce the effects of user specific characteristics on the perception results from perception model 612, making the results more a function of the quality of the media data. For instance, if perception model 612 is a speech recognition model, perception model tuner and trainer 616 may tune perception model 612 to suit the speaker's regional accent, voice characteristics, language, etc.

QoE quantifier 618 may be configured to quantify the QoE for the online application, in various embodiments. To do so, QoE quantifier 618 may aggregate the outputs of perception model 612 and/or score reliability estimator 614 into a measure of the QoE of the application, such as for a particular network path. Note that if media data is received from multiple endpoints, as is sometimes the case in videoconferences, quantifier 618 may aggregate the information from a given time period into a finalized QoE metric. Several approaches of aggregation could be employed such as by using averages, percentiles, heuristics, or the like, of the model performance metrics (e.g., confidence measures, reliability metrics, etc.).

As shown in FIG. 6C, other functions of media server 510, aside from facilitating the flow of media data between endpoints, may be any or all of the following: a.) to ensure that perception models being used by the perception systems are appropriate, b.) collecting the perception score telemetry, and c.) ensuring that the media system is collecting perception telemetry in the most effective manner possible by creating impairment and network/application scenarios that offer higher visibility.

In some embodiments, media server 510 may include perception model orchestrator 622, which is responsible for dictating the perception model parameters that are to be used for the perception scoring of a particular user's media. In one embodiment, perception model orchestrator 622 may store the latest perception models for each user in its database and provide the user clients with the model parameters along with the user's media information. In another embodiment, perception model orchestrator 622 may choose a perception model from a smaller set of models based on the user specific information, where an example would be to choose a model based on regional accents. Perception model orchestrator 622 may also simply collect the model parameters from the user-client every time a call is placed and distribute it among the users in the call. For new or unknown users, perception model orchestrator 622 may provide a default perception model or a specialized model based on the user's characteristics, such as their location.

Telemetry organizer 624 may be responsible for collecting all of the QoE scores for both the received and transmitted media of a given endpoint, to associate them with the telemetry from the communication system (e.g., indicative of various network-level and/or application-level metrics). Telemetry organizer 624 may also correlate any possible delays associated with the generation of the scores associated to the system telemetry at their respective timestamps.

In some embodiments, media server 510 may also include user feedback reconciliation engine 626, which has the ability to obtain actual user feedback and make adjustments to the perception models based on the feedback. For instance, in the case of a video conference, the participants may be asked to rate their satisfaction with their call experience. Such true user-experience labels can then be used by user feedback reconciliation engine 626 to identify any inconsistencies/discrepancies between the labels and the perception results from the perception models. In turn, if they exceed a certain threshold, user feedback reconciliation engine 626 may initiate changes to the system so that the inconsistencies/discrepancies can be resolved.

In one embodiment the suggested change could be to further train the perception models for better performance on the perception tasks. For instance, in the case of a speech-to-text perception model, the model could have low performance (e.g., low model confidence) simply because the model is not trained well enough. If the system then receives user labels indicating good quality, while the model performance scores are still low, the under training of the model can be verified by computing perception results on the undisturbed audio at the source. If, even the unperturbed audio of the speaker gives low confidence scores, this implies that the model is not trained well enough for the speaker and may be trained, accordingly.

In another embodiment, the QoE metrics or model performance metrics be compared against user-provided feedback. For instance, in the case of a discrepancy between the two, user feedback reconciliation engine 626 may isolate the segments of audio that exhibit the discrepancy. It could very well be that the discrepancy is because of segments of audio containing very user-specific terms like jargons, proper nouns, etc., have been assigned a low QoE, while the user label indicates high QoE. As a suggestion, perception model orchestrator 622 may suggest that the reliability thresholds for the particular user could be increased, to ensure that only words which are more common are used for purposes of computing the QoE.

As would be appreciated, the QoE metrics qualitied using the techniques herein may be used to effect configuration changes with respect to the online application. In some embodiments, the system may do so indirectly by providing the QoE metrics for presentation to an administrator. In turn, the administrator may then make whichever configuration changes they deem fit. In other embodiments, the QoE metric may be used by a routing mechanism, such as predictive application aware routing engine 412 in FIG. 4B, to cause traffic for the online application to be rerouted. In further embodiments, the QoE metric may be used to adjust one or more parameters used by the online application, such as by causing FEC to be used, a certain codec to be used, or the like.

Figure 7:
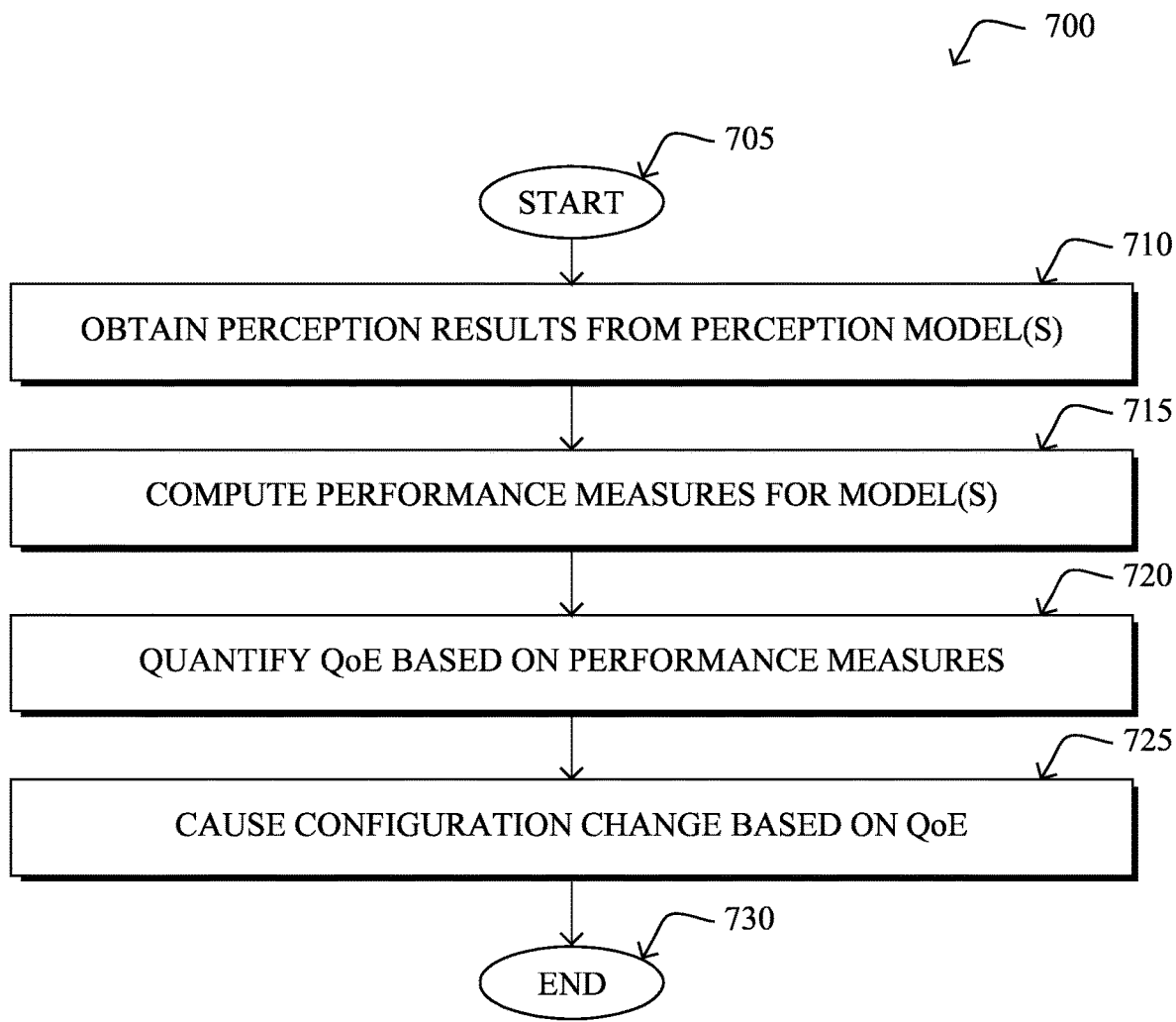
FIG. 7 illustrates an example simplified procedure for quantifying the QoE of an online application.

FIG. 7 illustrates an example simplified procedure for quantifying the QoE of an online application, in accordance with one or more embodiments described herein. For example, a non-generic, specifically configured device (e.g., device 200), such as controller for a network (e.g., an SDN controller), a server (e.g., a server associated with the online application), a networking device, or any other device in communication therewith, may perform procedure 700 by executing stored instructions (e.g., process 249). The procedure 700 may start at step 705, and continues to step 710, where, as described in greater detail above, the device may obtain perception results generated by one or more perception models that use media data as input that is transmitted between endpoints of an online application via a network. In some embodiments, the one or more perception models comprise a video recognition model or a speech recognition model. In further embodiments, the performance measures are indicative of a word recognition ratio by the one or more perception models or an object recognition ratio by the one or more perception models.

At step 715, as detailed above, the device may compute performance measures for the one or more perception models, based in part on the perception results and on the media data. In some embodiments, the media data comprises media data captured by one of the endpoints of the online application that send it to another endpoint of the online application. In further embodiments, the media data comprises media data captured by one of the endpoints of the online application that receives it from another endpoint of the online application. In another embodiment, the media data comprises at least one of: video data or audio data, and wherein the online application is a collaboration application.

At step 720, the device may quantify, and based on the performance measures, quality of experience for the online application, as described in greater detail above. For instance, in some embodiments, the device may use confidence measures for the one or more perception models as proxies for the QoE of the application.

At step 725, as detailed above, the device may cause a configuration change to be made with respect to the online application, based on the quality of experience. In some embodiments, the configuration change comprises causing traffic of the online application to be rerouted in the network. In further embodiments, the configuration change comprises a parameter change to at least one endpoint of the endpoints of the online application (e.g., by enabling or disabling the use of FEC, the use of a specific codec, a certain frame or other media rate, etc.). Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for inferring the user experience for voice and video applications using perception models, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method, comprising:
    obtaining, by a device, perception results generated by one or more perception models that use media data as input that is transmitted between endpoints of an online application via a network, the perception results indicative of human perceptible information contained in the media data as perceived by the one or more perception models;
    computing, by the device, performance measures for the one or more perception models, based in part on the perception results and on the media data, the performance measures indicative of a quality of the human perceptible information based on an accuracy of the one or more perception models;

quantifying, by the device and based on the performance measures, quality of experience for the online application; and causing, by the device, a configuration change to be made with respect to the online application, based on the quality of experience as quantified by the performance measures indicative of the quality of the human perceptible information based on the accuracy of the one or more perception models.

2. The method as in claim 1, wherein the media data comprises media data captured by one of the endpoints of the online application that sends it to another endpoint of the online application.

3. The method as in claim 1, wherein the media data comprises media data captured by one of the endpoints of the online application that receives it from another endpoint of the online application.

4. The method as in claim 1, wherein the media data comprises at least one of: video data or audio data, and wherein the online application is a collaboration application.

5. The method as in claim 1, wherein the one or more perception models comprise a video recognition model or a speech recognition model.

6. The method as in claim 1, wherein the performance measures are indicative of a word recognition ratio by the one or more perception models or an object recognition ratio by the one or more perception models.

7. The method as in claim 1, wherein the configuration change comprises causing traffic of the online application to be rerouted in the network or a parameter change to at least one endpoint of the endpoints of the online application.

8. The method as in claim 1, wherein the performance measures for the one or more perception models comprise confidence measures.

9. The method as in claim 1, further comprising:
causing, by the device, retraining of the one or more perception models, based on user feedback regarding the media data.

10. The method as in claim 1, further comprising:
receiving, at the device, the media data from the endpoints of the online application.

11. An apparatus comprising:
one or more network interfaces;
a processor coupled to the one or more network interfaces and configured to execute one or more processes; and
a memory configured to store a process that is executable by the processor, the process when executed configured to:
obtain perception results generated by one or more perception models that use media data as input that is transmitted between endpoints of an online application via a network, the perception results indicative of human perceptible information contained in the media data as perceived by the one or more perception models;
compute, based in part on the perception results and on the media data, performance measures for the one or more perception models, the performance measures indicative of a quality of the human perceptible information based on an accuracy of the one or more perception models;
quantify, based on the performance measures, quality of experience for the online application; and
cause a configuration change to be made with respect to the online application, based on the quality of experience as quantified by the performance measures indicative of the quality of the human perceptible information based on the accuracy of the one or more perception models.

12. The apparatus as in claim 11, wherein the media data comprises media data captured by one of the endpoints of the online application that sends it to another endpoint of the online application.

13. The apparatus as in claim 11, wherein the media data comprises media data captured by one of the endpoints of the online application that receives it from another endpoint of the online application.

14. The apparatus as in claim 11, wherein the media data comprises at least one of: video data or audio data, and wherein the online application is a collaboration application.

15. The apparatus as in claim 11, wherein the one or more perception models comprise a video recognition model or a speech recognition model.

16. The apparatus as in claim 11, wherein the performance measures are indicative of a word recognition ratio by the one or more perception models or an object recognition ratio by the one or more perception models.

17. The apparatus as in claim 11, wherein the configuration change comprises causing traffic of the online application to be rerouted in the network or a parameter change to at least one endpoint of the endpoints of the online application.

18. The apparatus as in claim 11, wherein the performance measures for the one or more perception models comprise confidence measures.

19. The apparatus as in claim 11, wherein the process when executed is further configured to:
cause retraining of the one or more perception models, based on user feedback regarding the media data.

20. A tangible, non-transitory, computer-readable medium storing program instructions that cause a device to execute a process comprising:
obtaining, by the device, perception results generated by one or more perception models that use media data as input that is transmitted between endpoints of an online application via a network, the perception results indicative of human perceptible information contained in the media data as perceived by the one or more perception models;
computing, by the device, performance measures for the one or more perception models, based in part on the perception results and on the media data, the performance measures indicative of a quality of the human perceptible information based on an accuracy of the one or more perception models;
quantifying, by the device and based on the performance measures, quality of experience for the online application; and
causing, by the device, a configuration change to be made with respect to the online application, based on the quality of experience as quantified by the performance measures indicative of the quality of the human perceptible information based on the accuracy of the one or more perception models.

* * * * *